United States Patent
Templer et al.

(10) Patent No.: US 6,207,015 B1
(45) Date of Patent: Mar. 27, 2001

(54) PROCESS FOR RECOVERING RAW MATERIALS FROM PAPER INDUSTRY MECHANICAL WASTE SLUDGE

(75) Inventors: Klaus Templer, Heidgraben; Günther Jacobs, Meerbusch; Wolfgang Tegethoff, Köln, all of (DE)

(73) Assignees: Stora Feldmuhle AG, Dusseldorf; Omya GmbH, Cologne, both of (DE)

( * ) Notice: Subject to any disclaimer, the term of this patent is extended or adjusted under 35 U.S.C. 154(b) by 0 days.

(21) Appl. No.: 08/039,260
(22) PCT Filed: Oct. 22, 1991
(86) PCT No.: PCT/EP91/02003
  § 371 Date: Apr. 15, 1993
  § 102(e) Date: Apr. 15, 1993
(87) PCT Pub. No.: WO92/08001
  PCT Pub. Date: May 14, 1992

(30) Foreign Application Priority Data
Oct. 26, 1990 (DE) .................................................. 40 34 054

(51) Int. Cl.⁷ .................................................... D21H 11/00
(52) U.S. Cl. ..................... 162/189; 162/190; 162/DIG. 9
(58) Field of Search ..................................... 162/189, 190, 162/DIG. 9

(56) References Cited

U.S. PATENT DOCUMENTS

| | | | |
|---|---|---|---|
| 3,833,468 | * | 9/1974 | Boniface ................................ 162/189 |
| 3,897,301 | * | 7/1975 | Bauman et al. ................. 162/DIG. 9 |
| 4,983,258 | * | 1/1991 | Maxham ......................... 162/DIG. 9 |
| 5,137,599 | * | 8/1992 | Maxham ......................... 162/DIG. 9 |

FOREIGN PATENT DOCUMENTS

559892 * 3/1944 (GB) .................................... 162/190

OTHER PUBLICATIONS

Screen Conversion Chart.*

* cited by examiner

*Primary Examiner*—Peter Chin
(74) *Attorney, Agent, or Firm*—Fulbright & Jaworski, LLP

(57) ABSTRACT

Raw materials useable in the manufacture of paper, cardboard and carton are recovered from waste sludge. After precipitation of the coarse particles, the sludge is centrifuged to remove black particles and then divided by fractional screening into its fiber, filler, pigment and agglomerate components. The agglomerate component is shear-treated and again fractionated, while the fibers, fillers and pigments, following further treatment if necessary, are fed to their points of reuse.

5 Claims, 1 Drawing Sheet

PROCESS FOR RECOVERING RAW MATERIALS FROM PAPER INDUSTRY MECHANICAL WASTE SLUDGE

FIELD OF THE INVENTION

This invention relates to a process for the recovery of raw materials for the manufacture of paper, pulp board and cardboard from the residual waste water slurry of a mechanical clarification apparatus or separation apparatus by separation into a fiber-rich portion and a filler-rich portion.

Processes for the recovery of paper fibers, fillers and coating pigments from cycles of the paper industry are well known.

The German publication, "Handbuch der Papier- und Pappenfabrikation (Papierlexikon)", Dr. Martin Sändig oHG, Niederwalluf, 1971, reports in detail under the key words: Waste Water Purification, Fiber Recovery, Sludge Processing and Pulp Collectors. Of the recovery processes performed with pulp collectors, three different methods of operation have long been in use: settling in so-called funnel or scraper clarifiers, filtration with or without filter aids on drum filters, and lastly flotation. The first two methods are used for the recovery of fibers and fillers, while flotation, with few exceptions, serves mainly for the recovery of useful fiber components.

All recovery processes are aimed at removing materials from not very contaminated cycles, since the reuse of the so-called trap stuff or thick stuff in the paper manufacturing process forbids a higher dirt content. This is especially true of so-called fine papers, which call for a high white content and a minimum number of dirt spots.

In the state of the art it is therefore common to feed so-called paper machine cycles II or III to a stuff catcher, while all leakage drains, bottom drains and other diffuse losses of a paper factory are fed by way of the so-called drain to the residual waste water purifier where the mechanical and possibly biological purification takes place. The sludge produced thereby is considerably contaminated with dirt particles, so that it cannot be reused for high-quality papers.

If the paper mill is properly operated, it is possible to reduce the undesirable losses of fibers, especially high-quality primary fibers and fillers to a minimum, but in case of disturbances or breakdowns, losses through the drain occur, which amount to as much as 20% of the daily gross machine production and have to be discarded on account of the heavy contamination.

DE-A-29 46 160 lastly describes the recovery of useful fiber materials from the wastes of a waste paper treatment plant with a flotation stage. The floated waste is separated by means of a hydrocyclone separator into a fiber-rich fraction and a hydrophobic light fraction. The fiber fraction is then, after an additional screening, returned to the primary flotation, while the hydrophobic light fraction and that which passes through the screen are discarded. In this process no recovery of basically useful fillers and pigment particles takes place.

OBJECTS OF THE INVENTION

It is therefore an object of the invention to make available a process that will permit recovering the usable fibers and fillers contained in the residual waste water sludge of the mechanical clarification plant without having to accept the limitations described above.

DESCRIPTION OF THE INVENTION

The above object is achieved according to the present invention by a process for the recovery of raw materials for the manufacture of paper, pulp board and cardboard from the residual waste water slurry of a mechanical clarification apparatus or separation apparatus by separation into a fiber-rich portion and a filler-rich portion, which comprises a) adjusting the solids content of the thin slurry to a value of 1 to 5% by weight by adding a mechanically clarified waste water and preparing a homogenized suspension, b) separating the coarse contaminant component with a screen of 1 to 2 mm mesh size, c) separating the black particle components of less than 10 micrometers by centrifugation in one or more hydrocyclones connected in series or parallel, d) fractionally fine screening of the accept component from the hydrocyclone or hydrocyclones with separation into the fiber component, agglomerate component and filler and pigment components, and e) returning the fiber component and the filler and pigment components into the raw material processing of the paper mill.

The waste water fed to the residual waste water clarification plant by way of the drain is first subjected in conventional manner to a mechanical sedimentation, optionally with the aid of flocculants. The thin sludge is then drawn continuously or batchwisely from the sludge collecting chamber by means of known apparatus, and its consistency is determined with the aid of conventional density measuring apparatus. If it is greater than 5 wt.-% dry content, the thin sludge is adjusted by the addition of mechanically clarified residual waste water to a consistency of 1 to 5 weight-%. Lower consistencies require very large volumes, while consistencies above 5 wt.-% lead to rheological problems with the danger of clogging in the treatment units that follow. In addition to automated consistency determination, the consistency can also be determined by conventional waste water testing methods. This is also recommended for the checking and calibration of the automated consistency determination.

After the consistency adjustment, in order to separate coarse dirt consisting of splinters, sand grains and other impurities, the homogenized suspension is passed through a screen with a mesh size of 1 to 2 mm. Self-cleaning flat screens or mechanically powered vibrating screens have proven useful for this purpose. The separated coarse dirt component is discarded. What passes through the sieve consists of fibers, fillers, pigments, fine sand, black particles and agglomerates of filler and pigments or pigments, fibers and filler. The term filler, as used in this connection is to be understood to mean the fine particles used in the paper mass; pigment is understood to be the fine particles used in the brush coating.

The unusable black particles have a particle size $>10\ \mu$m. They consist mainly of gray to black-colored sand, bottom detritus, machine detritus, coked lubricants, acid-attacked organic particles, rust and agglomerated dust, or a mixture thereof.

The separation of these black particles is performed by centrifugation in one or more hydrocyclones connected in series or parallel. Since a hydrocyclone sorts both according to differences in density as well as according to a shape factor, the precipitation of large-volume, stable pigment agglomerates, fiber lumps and fine wood splinters which are undesirable for the recycling is additionally performed.

By connecting several hydrocyclones in series and feeding the bottom run to an additional hydrocyclone, the loss of good substance is minimized and the good substance content is concentrated in the hydrocyclone overflow.

Any commercially available types of hydrocyclone can be used. Due to the abrasiveness of the black particle content, hydrocyclones of hard, corrosion-resistant material, such as ceramic oxide, have proven useful.

Preferred are so-called mini hydrocyclones with a nominal diameter of 10 to 100 mm, a good substance nozzle diameter of 7 to 14 mm, and a bottom run nozzle diameter of 2 to 8 mm.

The charging pressure of the hydrocyclones is selected between 0.5 and 6 bar. Higher pressures offer no advantage.

In a preferred embodiment of the process the black particle content precipitated in the hydrocyclones is subjected to an additional fine screening with a mesh size of greater than 25 $\mu$m, especially 63 $\mu$m, and what passes the screen is added to the good substance content. What passes the screen, however, can alternatively be fed back again ahead of the hydrocyclone or hydrocyclones in order to increase the precipitation rate of the black particles which are still in the passage through the screen. By this means it is possible to further increase the content of recovered good substance of fiber, filler and pigment.

As already indicated above, the hydrocyclone sorts not only by the shape factor but also by the density difference. If the content of black particles with a density near 1.0 is great, their separation takes place only moderately. A substantial improvement can then be achieved by lowering the density of the suspension medium. In a preferred process, therefore, air or gas is admixed as a diluent with the suspension stream being fed to the hydrocyclone, the air or gas content being set at 0 to 45 volume-percent. The admixture of the air or gas is performed statically or mechanically by a known technique by measurement of the volume of flow and a dispersion apparatus. Apparatus such as blast nozzles or stator-rotor machines known in flotation technology can be used for this purpose.

If in addition the flocculant structure of the suspension, which also contains agglomerates, is to be modified for a controlled separation, this can also be done by mechanical dispersion or by mechanical-chemical dispersion with the aid of a known chemical dispersant. Stator-rotor machines can be used as apparatus for the mechanical dispersion. A so-called dispersion pump in accordance with EP-B-0118 027 has proven especially useful, in which the chemical dispersant can additionally be metered in on the suction side.

The power expenditure necessary for the mechanical dispersion is selected between 0.2 and 3.0 kwh/m$^3$, measured by the power absorbed by the motor. By means of this process step up to 97% of the black particle content can be removed from the suspension.

The good substance yielded by the hydrocyclone or hydrocyclones now consists only of the fillers, pigments, fibers and agglomerates. To be able to return them to the originally high input quality standard another process step is necessary, which consists of fractional fine screening. As a result of this fine screening, on the one hand the fibers and fiber fragments that can be reused in paper production and on the other hand the fillers and pigments are recovered. The fiber slurry and the undispersed agglomerate residues are discarded.

The screen systems used for the fiber separation are either closed systems such as those known in the paper industry by the name of pressure sorters, or half-open vibrating screen systems with hole sizes or mesh sizes of 37 to 300 $\mu$m. The suspension freed of the fibers is immediately thereafter subjected to an additional fine screening to separate the agglomerate residues by means of screening with a mesh size >45 $\mu$m. Fiber screening and agglomerate screening can be performed directly in one apparatus if the screens are disposed directly one behind the other and separate withdrawal devices are provided. The solid contents necessary for the screening correspond directly to that of the good substance discharge from the final hydrocyclone stage. If, however, the solid content is to be reduced prior to the screening, or if an additional washing of the screened out fibers is to be performed, such as a high-pressure jet washing on the half-open vibrating screen, clear water from the clarification apparatus or fresh water can be used. Depending on requirements, the dry content of the screened-out fibers can be increased for later use by additional dewatering measures.

What passes through the 45 $\mu$m screen consists exclusively of fillers and pigments which can optionally be returned in high purity to the production process in the needed concentration.

If coated papers are to be made or processed in the paper mill, the recovered mixture of filler and pigment is composed of relatively coarse fillers and fine coating pigments, where both classes may again consist of kaolin, calcium carbonate, titanium dioxide and other known raw materials. It is therefore desirable to perform an additional separation in order to recover separately the very expensive coating pigments for use in the coating department, while the fillers are used for general applications. In a preferred process step therefore, the pigment fraction of the fine screening is subjected to a multi-step flotation. The purpose of this flotation is to perform the separation according to particle size distribution and type of pigment in order to assure general usage. The measures and apparatus necessary for that purpose are extensively described in DE-A-39 00 940, DE-A-39 00 941 and EP-A-0 291 271 to which reference is hereby made.

In another preferred embodiment of the process, the fiber, filler and pigment components are subjected singly or in admixture to a bleaching and preservation treatment by means of the addition of oxidizing bleaches. Oxygen compounds, such as atomic or molecular oxygen, ozone, chlorine dioxide, peroxide compounds, but especially hydrogen peroxide in an amount of 0.1 to 2.0% active bleaching agent with respect to absolutely dry solid, have proven useful for this purpose. The gaseous bleaches are metered in at the beginning of a relatively long, closed pipeline, while powdered and fluid peroxide compounds can be metered in directly, e.g., into open pump supply tanks.

The preservation treatment with the addition of oxygen can also be performed in a tubular reactor with the application of heat and pressure. There organic compounds dissolved in the suspension are thereby simultaneously broken down into water and carbon dioxide. Such a treatment is known by the name of "Zimpro process."

BRIEF DESCRIPTION OF THE DRAWINGS

The process in accordance with the invention will be further explained with the aid of FIG. 1, which is a schematic representation.

The thin sludge (1), after optional adjustment for consistency is fed to the sheet screen (2) for separation of the coarse contaminants. What passes through the screen is transported by the dispersion pump (10) to the hydrocyclones. The hydrocyclones (3a) to (3d) are connected in series, the bottom run of hydrocyclone (3a) and (3b) being fed to an additional hydrocyclone (3d) for further sorting. The black particles (4) are sorted out in hydrocyclone (3d) with a high efficiency.

Figure 1:
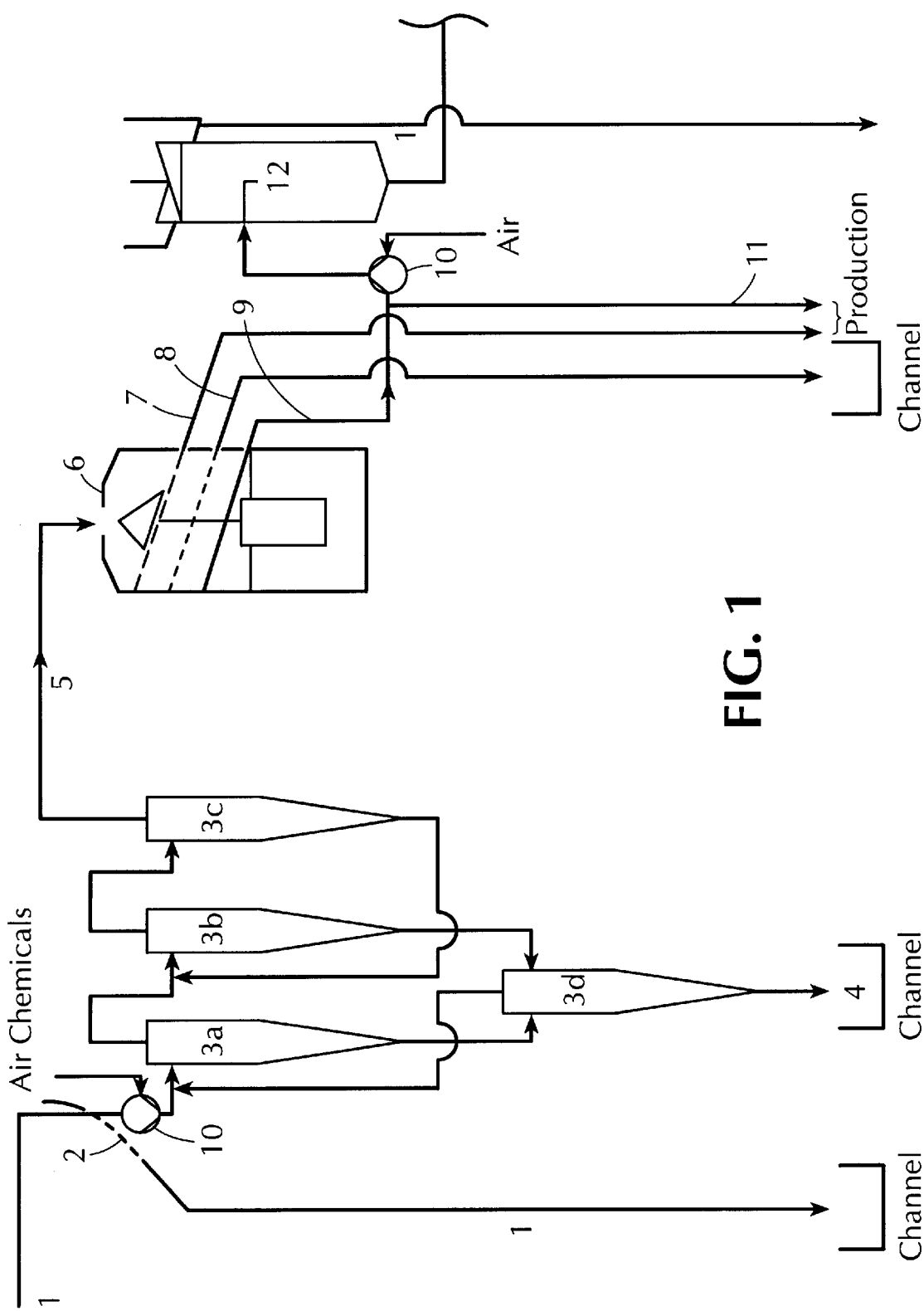

After optional adjustment of the concentration by the addition of water at 5, the good substance from hydrocyclone (3c) is fed to the fine screening (6) which combines the separation of the fibers (7), the agglomerates (8) and the fillers and pigments (9) in one apparatus. The agglomerates (8) are discarded or fed to a dispersion apparatus, not shown, for further processing.

The fillers and pigments (9) are transported either to a dewatering station (11) or for further separation through an additional dispersion pump (10) with air injection to the pigment flotation (12) of which only one cell is represented.

The above-described process is also suitable for processing waste water slurries consisting of fillers and fibers, or partial streams of fiber suspensions of the waste paper processing industry in the working up of waste paper from the ash removal process where special value is placed on clean sorting of the fillers and pigments as to type and fineness in order to adapt them to the corresponding quality requirements of the paper machine so as to improve the quality of the paper being produced.

What is claimed is:

1. The method of recovering raw material for the manufacture of paper, pulp board or cardboard from the residual waste water slurry of a mechanical clarification or separation apparatus by separating said slurry into a fiber-rich portion and a filler-rich portion, which comprises the sequential steps of a) adjusting the solids content of said waste water slurry to a value of 1 to 5% by weight by adding mechanically clarified waste water to form a homogeneous suspension, b) separating the coarse contaminant component of said suspension by passing it through a 1 to 2 mm mesh screen, c) separating the black particle components of said coarse contaminant component having a particle size greater than 10 micrometers by centrifugation in a hydrocyclone or in a plurality of hydrocyclones connected in series or in parallel, said hydrocyclones having a nominal diameter of 10 to 100 mm, and accept nozzle diameter of 7 to 14 mm and a reject nozzle diameter of 2 to 8 mm, the input pressure on the inlet side of said hydrocyclone or hydrocyclones being between 0.5 and 6 bar, d) fractionally separating the accept component exiting from the hydrocyclone or hydrocyclones into a fiber component, an agglomerate component and a filler and pigment component, by passing the accept component through an 80 to 300 um mesh screen for separation of the fiber component and through a screen with a mesh size greater than 45 um for separation of the agglomerate component, and returning the fiber component and the filler and pigment component into the raw material processing step of the paper, pulp board or cardboard manufacturing process.

2. The method of claim 1, wherein the black particle component separated in the hydrocyclones is subjected to an additional fine screening through a screen with a mesh size of greater than 25 micrometer, and the material which passes through this screen is added to the accept component.

3. The method of claim 1, wherein the suspension to be centrifuged in the hydrocyclone is additionally aerated or gassed prior to feeding it into the hydrocyclone, the air/gas content of the suspension being adjusted to 0 to 45% by volume.

4. The method of claim 1, wherein the agglomerate component is broken up by treatment with an energy of 0.2 to 3 kwh/m$^3$ of suspension.

5. The method of claim 1, wherein the fiber and filler and pigment components are subjected individually or together to a bleaching and preservative treatment with oxidizing bleaches.

* * * * *